No. 886,889. PATENTED MAY 5, 1908.
M. C. STOKES.
HANDLE GRIP FOR CYCLE HANDLE BARS.
APPLICATION FILED MAY 28, 1907.
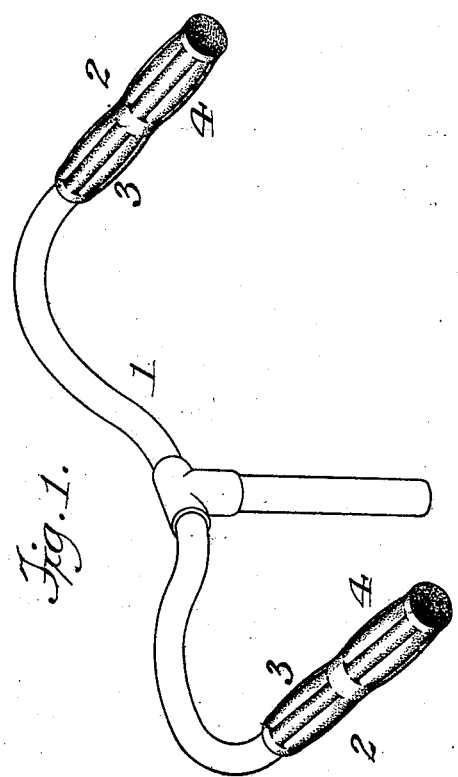
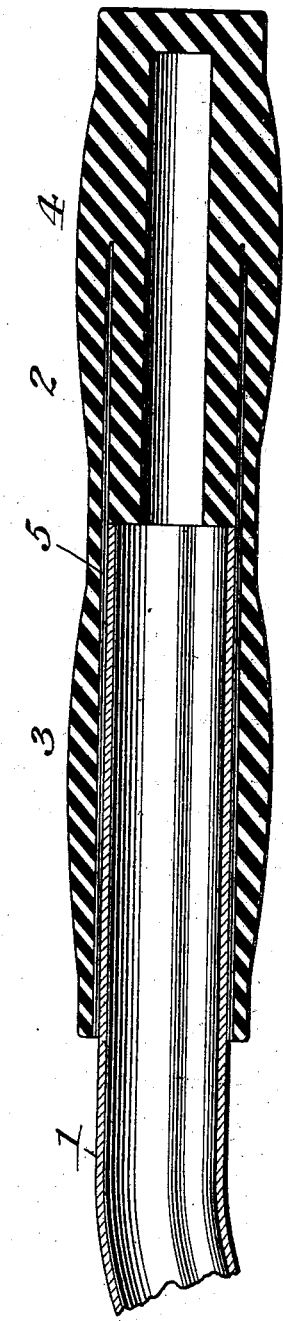
Witnesses
Martin C. Stokes, Inventor
By his Attorney

UNITED STATES PATENT OFFICE.

MARTIN C. STOKES, OF HARTFORD, CONNECTICUT, ASSIGNOR TO THE HARTFORD RUBBER WORKS COMPANY, A CORPORATION OF CONNECTICUT.

HANDLE-GRIP FOR CYCLE HANDLE-BARS.

No. 886,889.     Specification of Letters Patent.     Patented May 5, 1908.

Application filed May 28, 1907. Serial No. 376,099.

*To all whom it may concern:*

Be it known that I, MARTIN C. STOKES, a citizen of the United States, residing in the city of Hartford, county of Hartford, and State of Connecticut, have invented a new and useful Improvement in Handle-Grips for Cycle Handle-Bars, of which the following is a specification.

This invention relates to handle grips for cycle handle bars and more particularly to grips for use on the handle bars of motor-cycles which are frequently driven at high speed and in which the handle bars are, consequently, subjected to excessive vibration.

The principal object of the invention is to provide a handle grip presenting two portions; one designed for use when care in steering is required, and the other designed to present a grip substantially free from vibrations and adapted to be gripped by the rider when the steering is easy. Minor objects of the invention are to provide a grip of the character mentioned which is of simple design and inexpensive in construction, as well as of a character to afford a firm hold when grasped by the rider.

In the accompanying drawings I have illustrated a preferred form of the invention, the scope of which is defined in the appended claim.

In the drawings: Figure 1 is a perspective view of a handle bar equipped with the improved grips; Fig. 2 is a longitudinal section through one of the grips and the adjacent portion of the handle bar.

Referring to the drawings by the reference characters, which designate corresponding parts in the several views, 1 designates the handle bar, which is preferably formed of steel tubing, as usual. Upon each end of the handle bar one of the improved grips is secured by cement or otherwise, as preferred. Each grip is designated as an entirety by the character 2, and comprises a main portion 3, characterized by a large bore to receive the end of the handle bar, and an extension portion 4 with a smaller bore. Both portions of the grip are preferably of larger diameter in the middle than at the ends and are also preferably corrugated. The material employed in the formation of the grips is preferably rubber, which is reinforced by the insertion of fabric as indicated at 5. The main portion of each grip is rigidly held upon one end of the handle bar and affords a firm hold of the character required for accuracy in steering wherever accurate steering is necessary.

The extension portion of each grip, being supported only indirectly by the handle bar and being formed of a vulcanized rubber compound or other material of like elasticity, is almost free from the vibrations imparted to the handle bar and, being formed with a thick wall, it is susceptible of a tight grasp, thus affording the rider such a degree of control over the machine as is necessary under ordinary conditions. The thick wall of the extension portion of the improved handle grip and the abutment formed for the end of the handle bar by the reduction in the bore of the extension both contribute in an important degree to the freedom of the extension portion of the grip from the vibrations of the handle bar. The thick wall of the extension and the consequent weight of the extension make it inert or sluggish in responding to vibrations.

I am aware that extension handle grips designed to afford a hand hold free from the vibration of the handle bar have been heretofore devised by others, the handle grips of which I am aware having been of hollow construction and having the extension portion formed with thin walls and provided with an interior coiled spring to afford the requisite resistance to a firm grasp. I do not, therefore, claim broadly as my invention a handle grip for the handle bars of cycles characterized by a resilient extension beyond the extremity of the bar.

What I do claim as my invention is:

A handle grip for the handle bars of cycles formed of resilient material and comprising a thin-walled portion having a large bore adapted to receive the end of the handle bar, a thick-walled extension having a reduced bore, and a tubular fabric portion forming a lining for the handle-receiving portion and provided with an axial extension embedded in the thick-walled extension.

In witness whereof, I have signed my name in the presence of two witnesses.

MARTIN C. STOKES.

Witnesses:
J. BOSSEN,
H. B. CARPENTER.